US012728682B1

(12) United States Patent
Coast

(10) Patent No.: US 12,728,682 B1
(45) Date of Patent: Sep. 8, 2026

(54) AMPHIBIOUS CRAFT

(71) Applicant: John B. Coast, Baton Rouge, LA (US)

(72) Inventor: John B. Coast, Baton Rouge, LA (US)

( * ) Notice: Subject to any disclaimer, the term of this patent is extended or adjusted under 35 U.S.C. 154(b) by 209 days.

(21) Appl. No.: 18/812,164

(22) Filed: Aug. 22, 2024

Related U.S. Application Data

(63) Continuation-in-part of application No. 29/933,802, filed on Mar. 21, 2024, now Pat. No. Des. 1,104,712.

(60) Provisional application No. 63/572,857, filed on Apr. 1, 2024.

(51) Int. Cl.
*B60F 3/00* (2006.01)

(52) U.S. Cl.
CPC ............ *B60F 3/0015* (2013.01); *B60F 3/003* (2013.01)

(58) Field of Classification Search
CPC ............................... B60F 3/0015; B60F 3/003
See application file for complete search history.

(56) References Cited

U.S. PATENT DOCUMENTS

D32,815 S 6/1900 Hubbard
2,546,523 A 3/1951 Reynolds
2,855,236 A 10/1958 Knauff
3,306,250 A * 2/1967 Pitchford .............. B60F 3/0015 440/12.54
3,385,255 A * 5/1968 Raymond ............. B60F 3/0007 180/9
3,760,763 A * 9/1973 Brusacoram .......... B60F 3/0069 440/12.64
3,842,785 A * 10/1974 Rivet .................... B60F 3/0015 305/120
3,976,025 A * 8/1976 Russell ................. B60F 3/0015 305/165
4,433,634 A * 2/1984 Coast .................... B60F 3/0061 180/9.1
4,813,725 A 3/1989 Mosch
4,846,092 A * 7/1989 Wilson .................. B60F 3/0015 440/12.64
4,961,395 A * 10/1990 Coast .................... B60F 3/0015 305/137
D344,009 S 2/1994 Fontenot
D350,275 S 9/1994 Olsen et al.
5,379,709 A * 1/1995 Wilkerson ............. B62D 55/06 440/12.64
5,811,741 A * 9/1998 Coast ....................... G01V 1/16 175/21

(Continued)

*Primary Examiner* — Marc Q Jimenez
*Assistant Examiner* — Jovon E Hayes
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

An improved amphibious craft having a hull having spaced apart pontoons is fitted with belts and cleats. A platform is connected to each said pontoon. A plurality of bogie wheels are connected to each pontoon. One or more belts encircle each pontoon. Drive and guide lugs are attached to each of the belts having drive lugs positioned on opposing sides of each bogie wheel. The drive and guide lugs help center the tracks/belts relative to the bogie wheels. A plurality of polymeric cleats of special configuration are attached to the belts and drive lugs with fasteners. Each cleat has a central longitudinal axis. Each cleat has a center pad, a pair of spaced apart end pads and diagonally extending channels, spaces, or gaps in between each end pad and the center pad.

20 Claims, 17 Drawing Sheets

(56) References Cited

U.S. PATENT DOCUMENTS

| | | | | |
|---|---|---|---|---|
| 5,899,164 | A * | 5/1999 | Coast | B63C 13/00 440/12.63 |
| 6,305,882 | B1 | 10/2001 | Coast et al. | |
| 6,582,258 | B2 * | 6/2003 | Morin | B60F 3/0015 305/165 |
| D495,583 | S | 9/2004 | Senn | |
| 6,921,304 | B2 * | 7/2005 | Hewitt | B60F 3/0015 305/120 |
| D536,950 | S | 2/2007 | Liang et al. | |
| D567,067 | S | 4/2008 | Liang | |
| 7,407,199 | B2 | 8/2008 | Richardson | |
| D583,216 | S | 12/2008 | Wolf | |
| 7,575,289 | B2 * | 8/2009 | Sugihara | B62D 55/08 305/107 |
| 7,588,106 | B2 * | 9/2009 | Koskinen | B62D 49/0678 440/12.63 |
| 7,670,200 | B2 * | 3/2010 | Wilson | B60F 3/0015 440/12.5 |
| 8,002,596 | B2 * | 8/2011 | Wernicke | B63H 1/34 440/12.63 |
| 8,721,378 | B2 * | 5/2014 | Da Silva | B63H 1/34 440/96 |
| D721,942 | S | 2/2015 | Liang et al. | |
| 9,162,545 | B1 * | 10/2015 | Wilson | B62D 55/253 |
| 9,260,893 | B1 | 2/2016 | Ruspil | |
| 9,284,001 | B2 * | 3/2016 | Schmidt | B62D 55/202 |
| 9,341,006 | B1 | 5/2016 | Lawrence | |
| D775,929 | S | 1/2017 | Liau | |
| 9,545,964 | B2 * | 1/2017 | Shimozono | B62D 55/244 |
| 9,630,465 | B2 * | 4/2017 | Coast | B63H 1/34 |
| 9,931,899 | B2 | 4/2018 | Coast | |
| 10,011,152 | B1 * | 7/2018 | Kremkau | G01C 13/00 |
| 10,174,559 | B1 | 1/2019 | Coast et al. | |
| 10,293,648 | B2 | 5/2019 | Coast | |
| 10,464,383 | B2 * | 11/2019 | Coast | B60F 3/0038 |
| 10,738,516 | B1 | 8/2020 | Lawrence | |
| 11,225,116 | B2 * | 1/2022 | Watling | B62D 11/105 |
| 11,319,728 | B2 | 5/2022 | Fullenwider et al. | |
| 2004/0026932 | A1 | 2/2004 | Coleman et al. | |
| 2004/0248480 | A1 * | 12/2004 | Wilson, Jr. | B63B 35/38 440/12.56 |
| 2005/0077735 | A1 | 4/2005 | Generowicz et al. | |
| 2007/0209281 | A1 | 9/2007 | Flory et al. | |
| 2009/0179436 | A1 * | 7/2009 | Sagalara | E05B 65/0864 49/449 |
| 2011/0248516 | A1 | 10/2011 | Liang et al. | |

* cited by examiner

AMPHIBIOUS CRAFT

CROSS-REFERENCE TO RELATED APPLICATIONS

This application is a continuation in part of US Design patent application Ser. No. 29/933,802, filed 21 Mar. 2024, which is hereby incorporated herein by reference.

This application claims the benefit of U.S. Provisional Patent Application Ser. No. 63/572,857, filed 1 Apr. 2024, which is hereby incorporated herein by reference.

Priority of US Design patent application Ser. No. 29/933,802, filed 21 Mar. 2024, and U.S. Provisional Patent Application Ser. No. 63/572,857, filed 1 Apr. 2024, each of which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved amphibious craft having spaced apart pontoons, a platform spanning between the pontoons, a track or belt that encircles each pontoon, drive and guide lugs, and specially configured polymeric cleats that are attached to the tracks or belts and drive/guide lugs.

2. General Background of the Invention

Amphibious craft having spaced apart pontoons and tracks that encircle the pontoons have been patented. Early examples include the Reynolds U.S. Pat. No. 2,546,523 and the Coast patent number 4,433,634. The named applicant has received a number of patents directed to amphibious craft as listed in the following table.

US Design patent application Ser. No. 29/933,802, filed 21 Mar. 2024, is hereby incorporated herein by reference.

The following U.S. Patents of Table 1 are hereby incorporated herein by reference thereto:

TABLE 1

| Pat. No. | Description | Issue Date |
|---|---|---|
| 4,433,634 | TRACKED, AMPHIBIOUS VEHICLE WITH TRACK SECUREMENT AND GUIDE MEANS | Feb. 28, 1984 |
| 4,961,395 | TRACKED, AMPHIBIOUS VEHICLE WITH TRACK SECUREMENT AND GUIDE MEANS | Oct. 9, 1990 |
| 5,811,741 | APPARATUS FOR PLACING GEOPHONES BENEATH THE SURFACE OF THE EARTH | Sep. 22, 1998 |
| 5,899,164 | TRACKED AMPHIBIOUS MARSH VEHICLE WITH IMPROVED TRACK AND DRIVE ARRANGEMENT | May 4, 1999 |
| 6,305,882 | APPARATUS FOR PLACING AUGER TYPE ANCHORS | Oct. 23, 2001 |
| 9,630,465 | AMPHIBIOUS MARSH CRAFT | Apr. 25, 2017 |
| 9,931,899 | AMPHIBIOUS MARSH CRAFT | Apr. 3, 2018 |
| 10,293,648 | AMPHIBIOUS MARSH CRAFT | May 21, 2019 |
| 10,464,383 | AMPHIBIOUS TRANSPORT SYSTEM | Nov. 5, 2019 |

TABLE 1-continued

| Pat. No. | Description | Issue Date |
|---|---|---|
| 10,174,559 | APPARATUS FOR SELECTIVE PLACEMENT OF AUGER OR ROD TYPE ANCHORS | Jan. 8, 2019 |

BRIEF SUMMARY OF THE INVENTION

The present invention is directed to an improved amphibious craft having spaced apart pontoons, a platform connecting to the pontoons, a belt or track that encircles each pontoon and multiple polymeric, specially configured cleats attached (e.g., bolted) to the belts or tracks. The cleats are also fastened (e.g., bolted) to drive and guide lugs. A belt or track encircles one pontoon (e.g., port side) and is fitted with a first plurality of the polymeric cleats. A second pontoon (e.g., starboard) has an encircling belt or track fitted with a second plurality of polymeric cleats.

Each cleat has end portions, raised pads separated by gaps or channels and end portions with sockets that shield or protect bolts used to fasten the cleat to the belt or track and drive/guide lugs.

In one embodiment, the cleat has a center pad and end pads spaced away from the center pad. The center pad is part of a solid center that increases cleat resistance to bending.

In one embodiment, the center pad has large radius curved portions (e.g., ¾ inches) that reduce stress concentration areas, thus increasing bending resistance.

In one embodiment, the cleat end pads have tapered portions that reduce the likelihood of point loading (e.g., stump), thus protecting the track drive and guide lugs while increasing the strength on the ends of the cleat.

In one embodiment, each end pad has a maximum thickness where the bogie wheels run, thus improving cleat wear and increasing cleat life.

In one embodiment, each cleat end pad has a counter bored slot or socket that protects drive lug bolt heads, increasing serviceability of the track and cleats.

In one embodiment, a solid, rigid wiper can be added to some cleats which prevents mud/soil buildup on the pontoons.

The present invention includes an amphibious craft having a hull having spaced apart pontoons, a platform that connects to each pontoon, a plurality of bogie wheels connected to each pontoon, one or more belts that encircle each pontoon, and drive lugs preferably attached to each of the belts, the drive lugs can be positioned on opposing sides of each bogie wheel. A plurality of polymeric cleats can be attached to the belts and drive lugs with fasteners. Each cleat can have a central longitudinal axis, a center pad, a pair of spaced apart end pads, and diagonally extending channels or spaces or gaps in between each end pad and the center pad. Each cleat can have a tapered section with a socket. Each fastener can have a head located within the socket.

In one embodiment, there can be a large radius curved section next to the center pad.

In one embodiment, the cleat can have fastener receptive openings in between the center pad and the end pads.

In one embodiment, there can be fastener receptive openings communicating with each socket.

In one embodiment, further comprising a wiper on the cleat extending away from the center pad.

In one embodiment, the wiper can be rigid and of polymeric material.

In one embodiment, the fasteners can be bolts each having a bolt head located in a socket.

In one embodiment, each tapered section can include diagonally extending surfaces on opposing sides of the socket.

In one embodiment, each channel or space or gap can be between a first surface on the center pad and a second surface on the end pad, the first and second surfaces each forming an acute angle with the central longitudinal axis.

In one embodiment, the center pad can have a wear surface that is generally trapezoidally shaped.

The present invention includes an amphibious craft having a hull having spaced apart pontoons, a platform that connects to each pontoon, a plurality of bogie wheels connected to each pontoon, one or more belts that encircle each pontoon, and drive lugs attached to each of the belts, the drive lugs positioned to travel on opposing sides of each bogie wheel. A plurality of polymeric cleats can be attached to the belts and drive lugs with fasteners. Each cleat can have a central longitudinal axis, a center pad, a pair of spaced apart end pads and diagonally extending channels or spaces or gaps in between each end pad and the center pad. Each cleat can have a tapered section with a socket. Each fastener can extend into the socket.

The present invention includes an amphibious craft, comprising a hull having spaced apart pontoons, a platform that connects to each pontoon, a plurality of bogie wheels connected to each pontoon, one or more belts that encircle each pontoon, and drive lugs attached to each of the belts, the drive lugs positioned to travel on opposing sides of each bogie wheel. A plurality of polymeric cleats can be attached to the belts and drive lugs with fasteners, each cleat having a central longitudinal axis. Each cleat can have a center pad, a pair of spaced apart end pads and diagonally extending gaps in between each end pad and the center pad.

In one embodiment, there can be a large radius curved section next to the center pad.

In one embodiment, the cleat can have fastener receptive openings in between the center pad and the end pads.

In one embodiment, further comprising a wiper on the cleat extending away from the center pad.

In one embodiment, the wiper can be rigid and of polymeric material.

In one embodiment, each tapered section includes diagonally extending surfaces on opposing sides of the socket.

In one embodiment, each channel or space or gap can be between a first surface on the center pad and a second surface on the end pad, the first and second surfaces each forming an acute angle with the central longitudinal axis.

In one embodiment, the center pad can have a wear surface that is generally trapezoidally shaped.

In one embodiment, each diagonally extending gap can have a parallelogram shape.

BRIEF DESCRIPTION OF DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
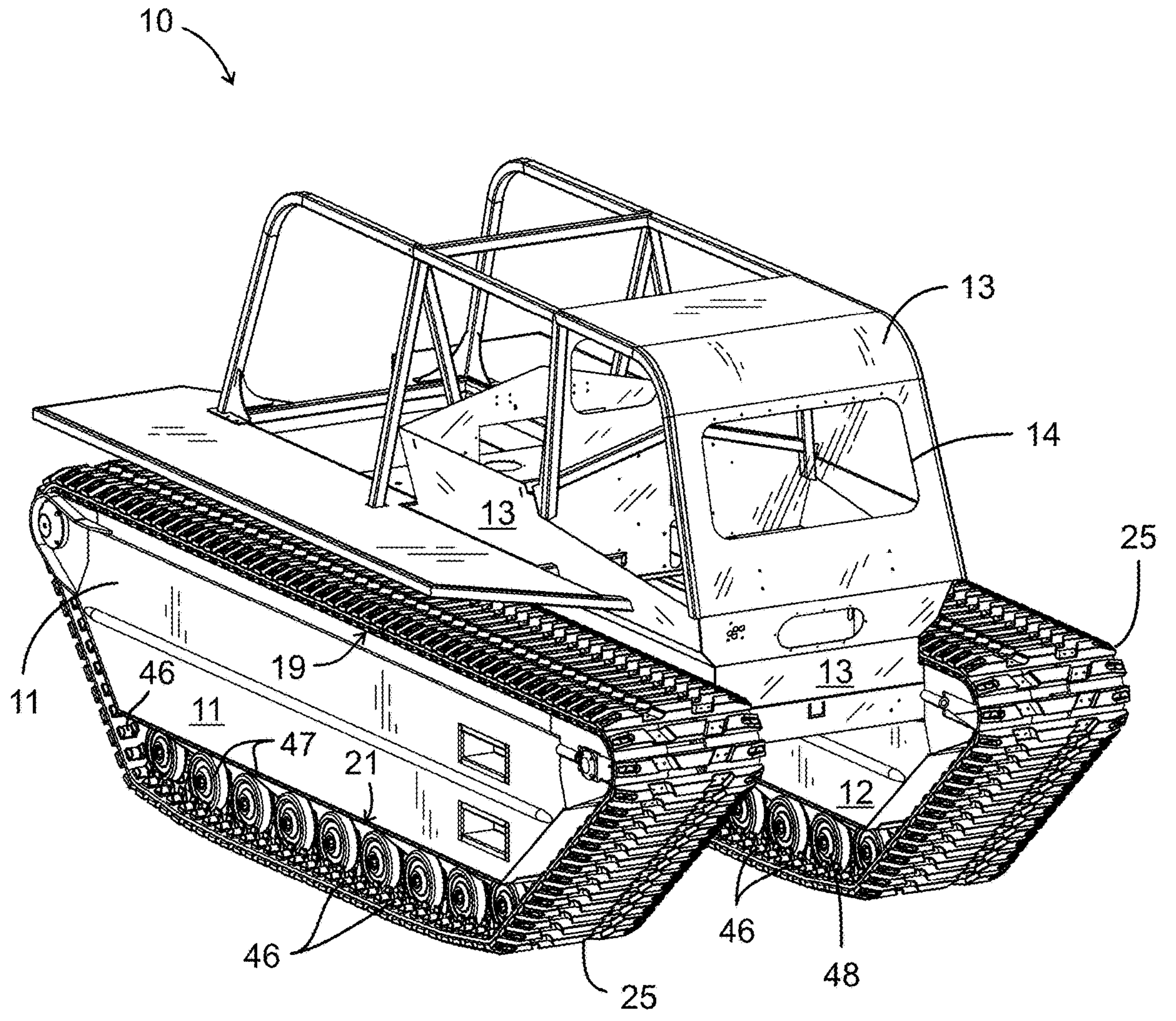
FIG. 1 is a perspective view of a preferred embodiment of the apparatus of the present invention.
Figure 2:
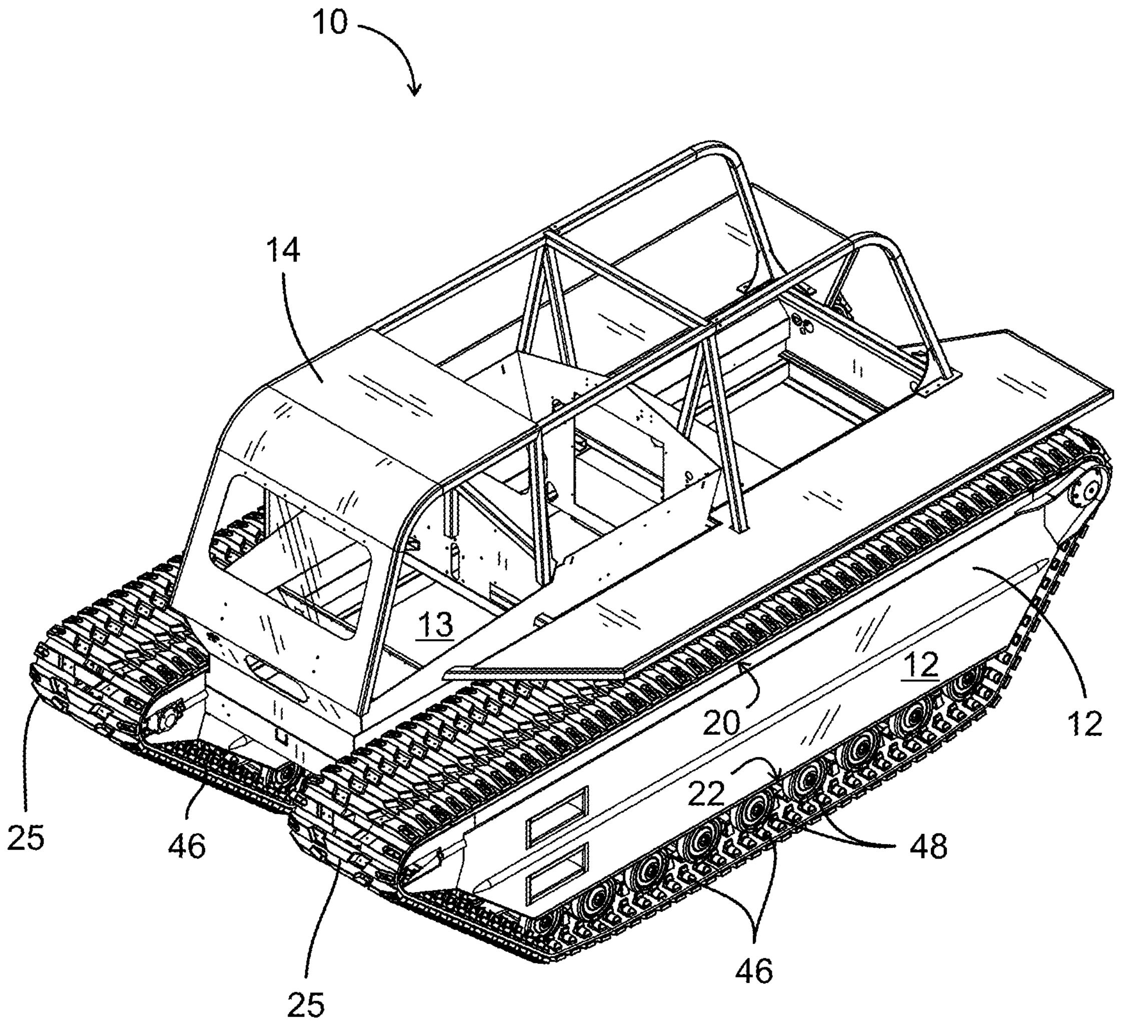
FIG. 2 is a perspective view of a preferred embodiment of the apparatus of the present invention.
Figure 3:
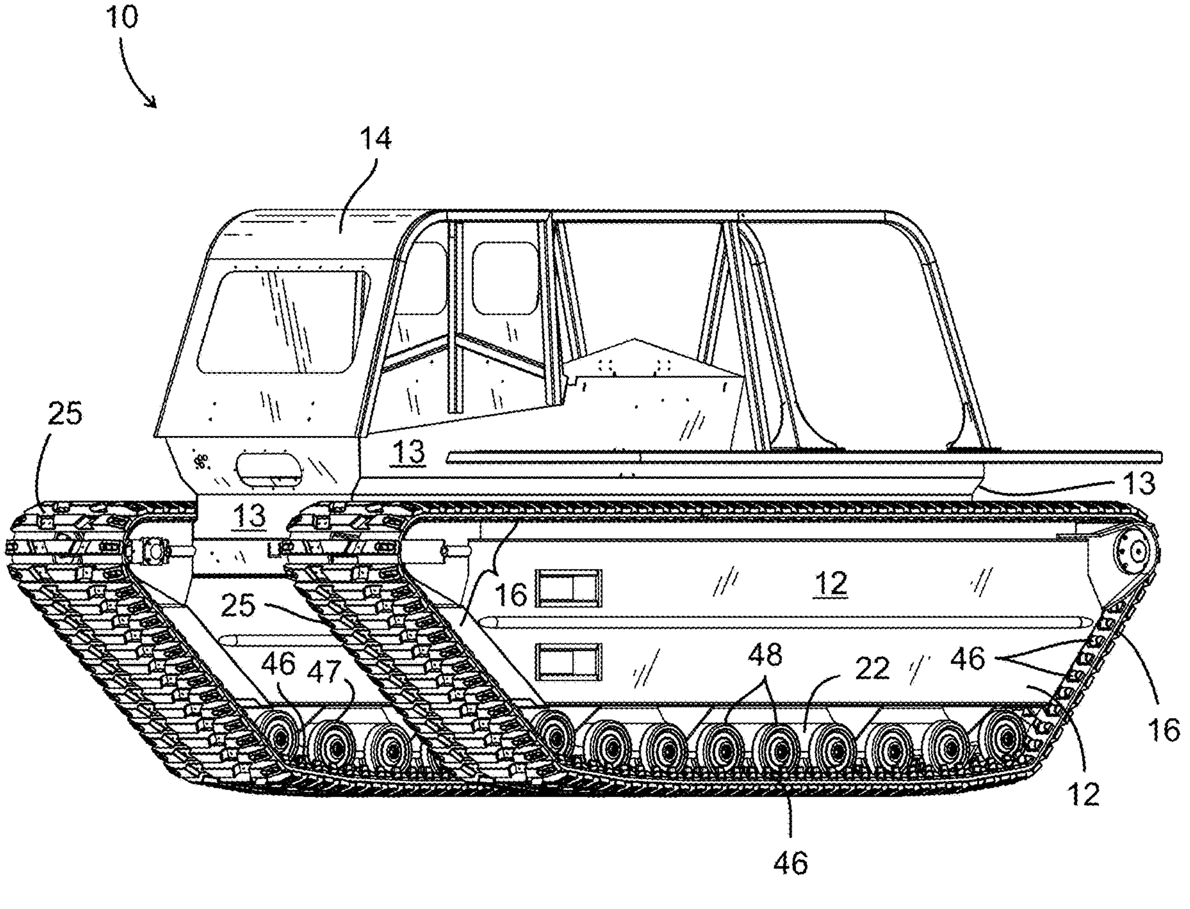
FIG. 3 is a perspective view of a preferred embodiment of the apparatus of the present invention.
Figure 4:
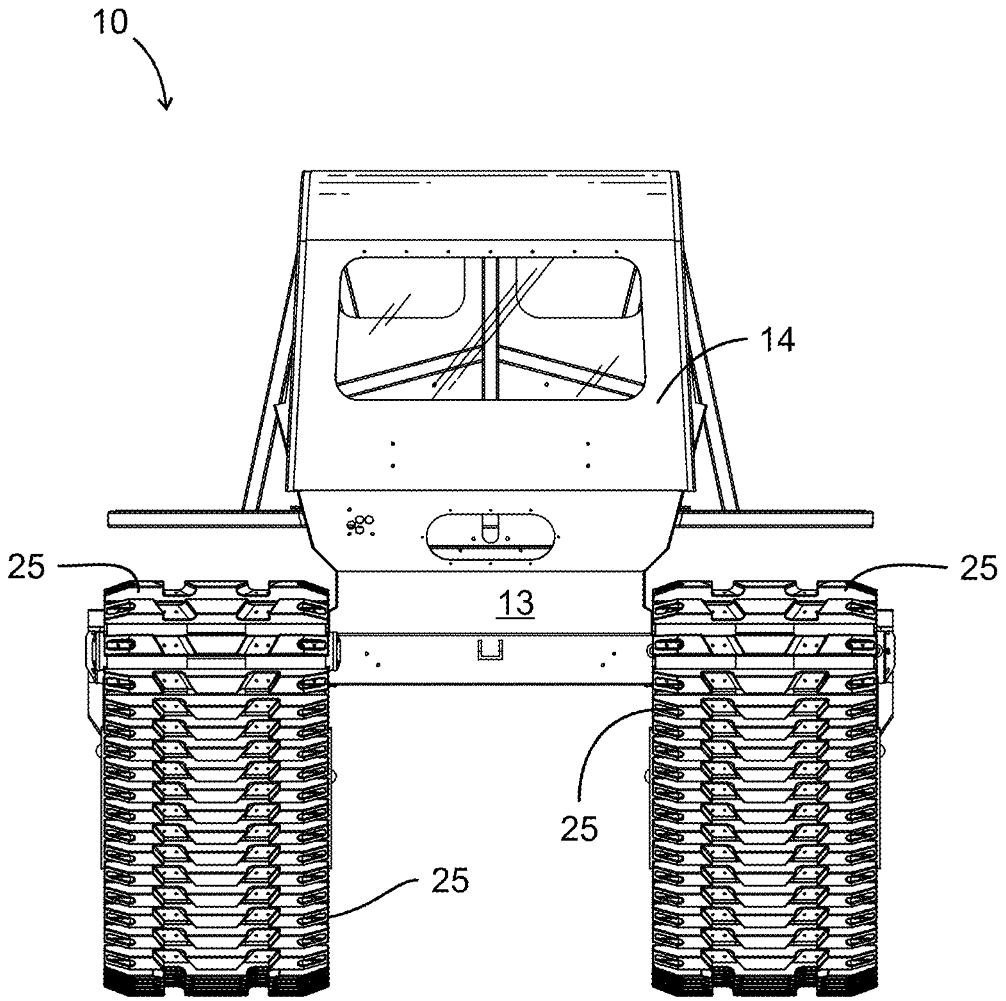
FIG. 4 is a front elevation view of a preferred embodiment of the apparatus of the present invention.
Figure 5:
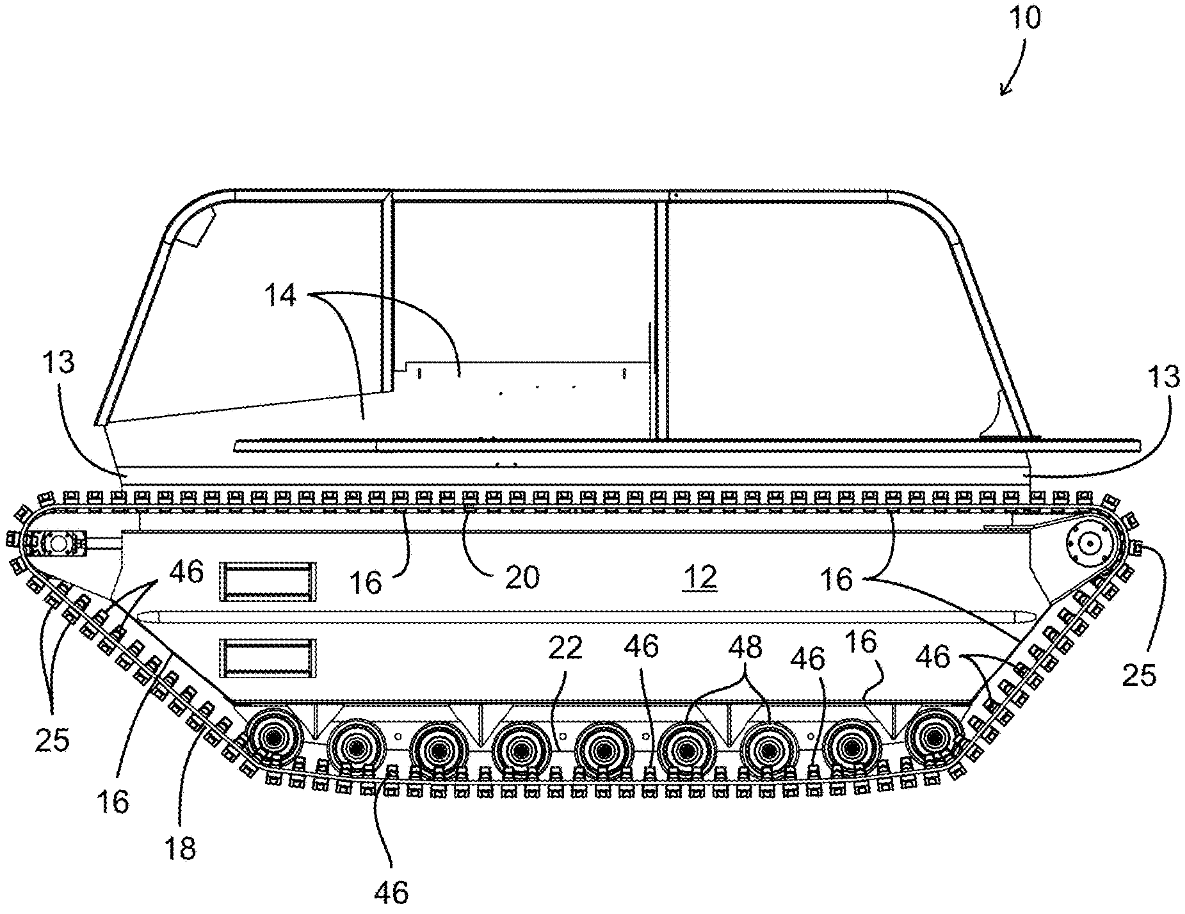
FIG. 5 is a side, elevation view of a preferred embodiment of the apparatus of the present invention.
Figure 6:
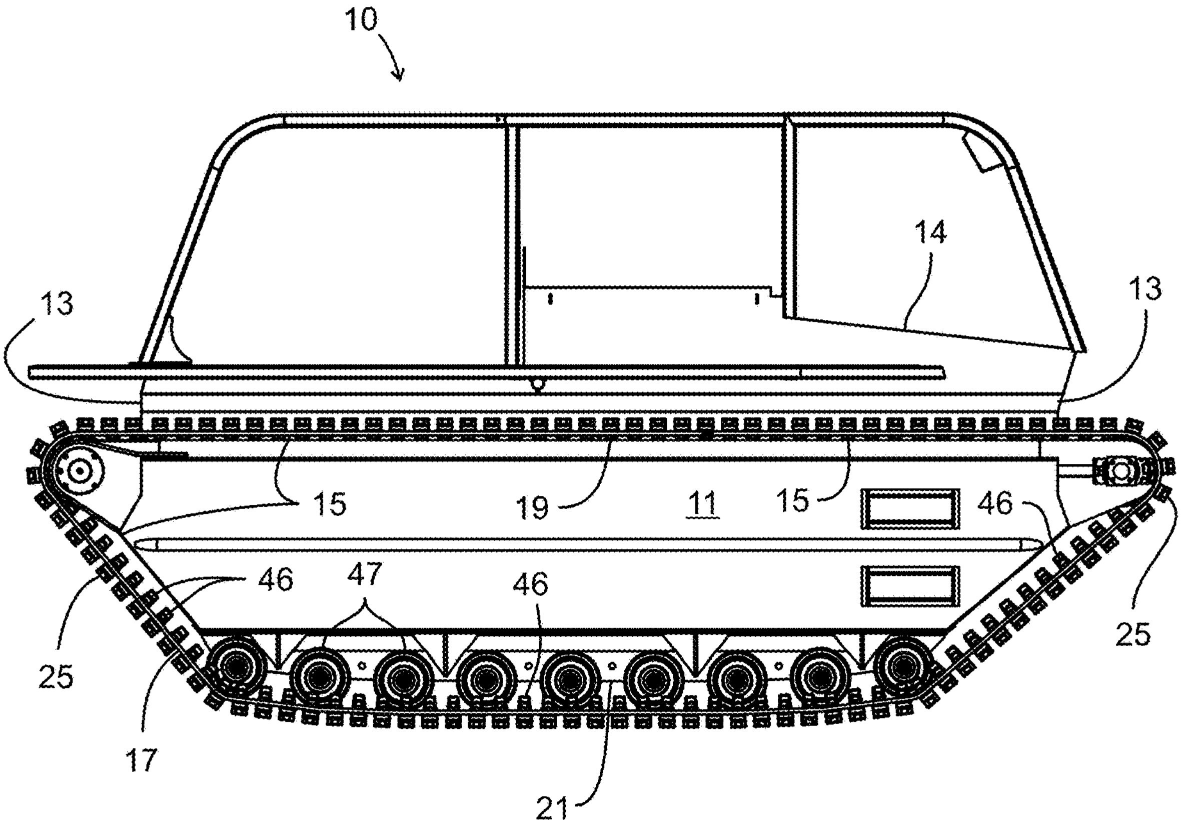
FIG. 6 is a side, elevation view of a preferred embodiment of the apparatus of the present invention.
Figure 7:
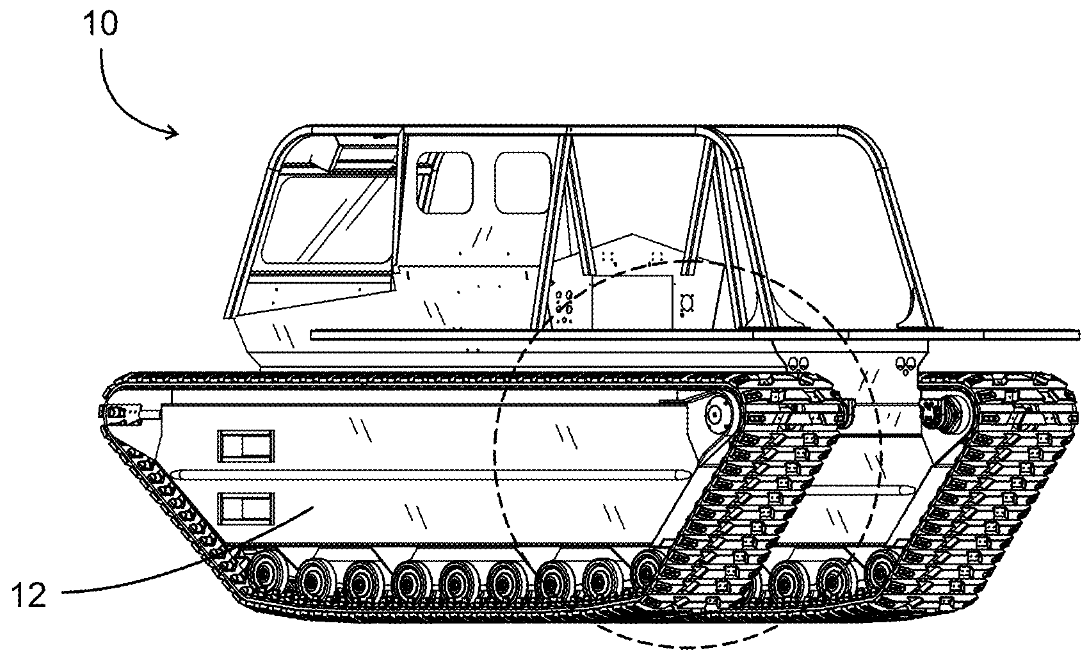
FIG. 7 is a perspective view of a preferred embodiment of the apparatus of the present invention.
Figure 7A:
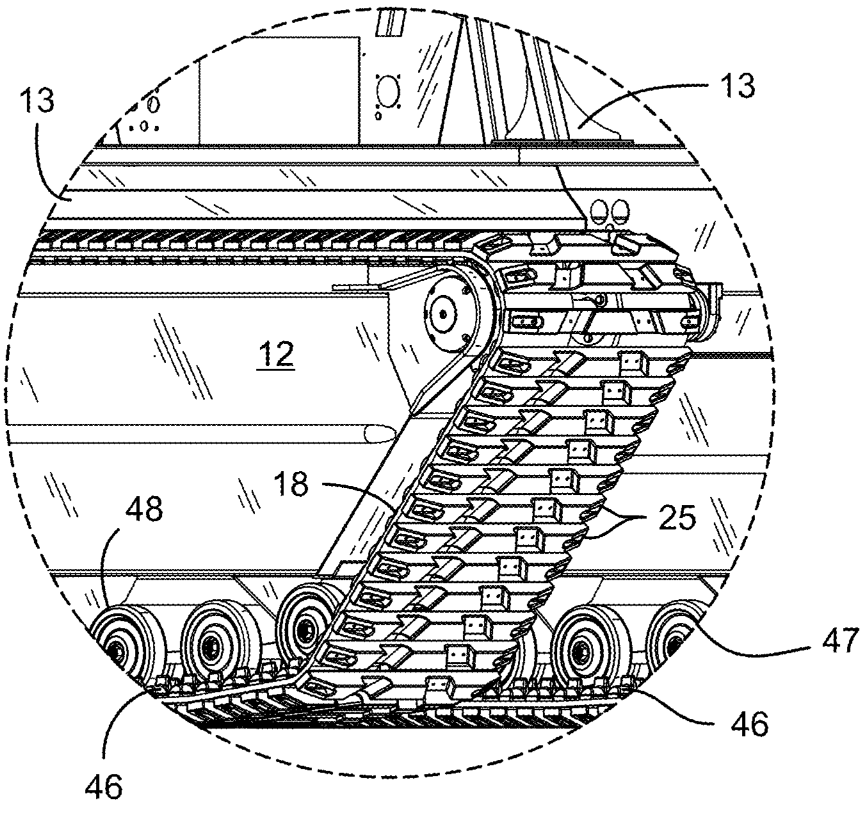
FIG. 7A is a partial perspective view of a preferred embodiment of the apparatus of the present invention and an enlargement of the area encircled on FIG. 7.
Figure 8:
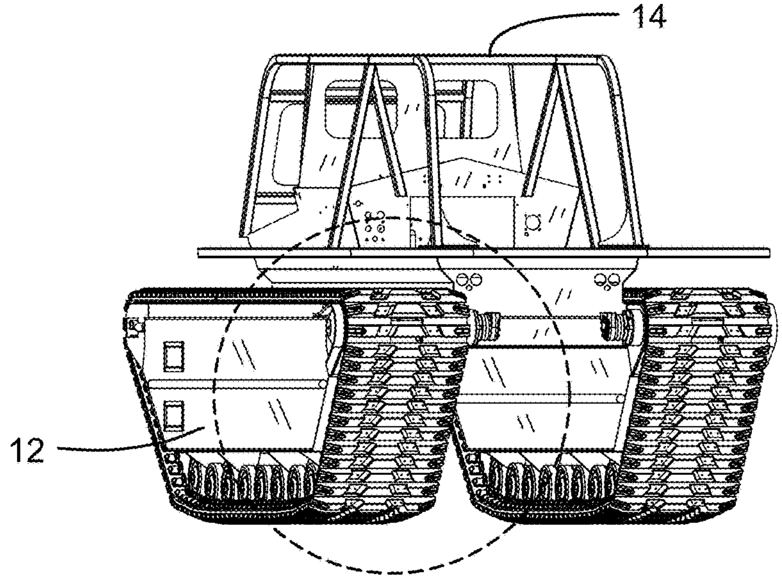
FIG. 8 is a perspective view of a preferred embodiment of the apparatus of the present invention.
Figure 8A:
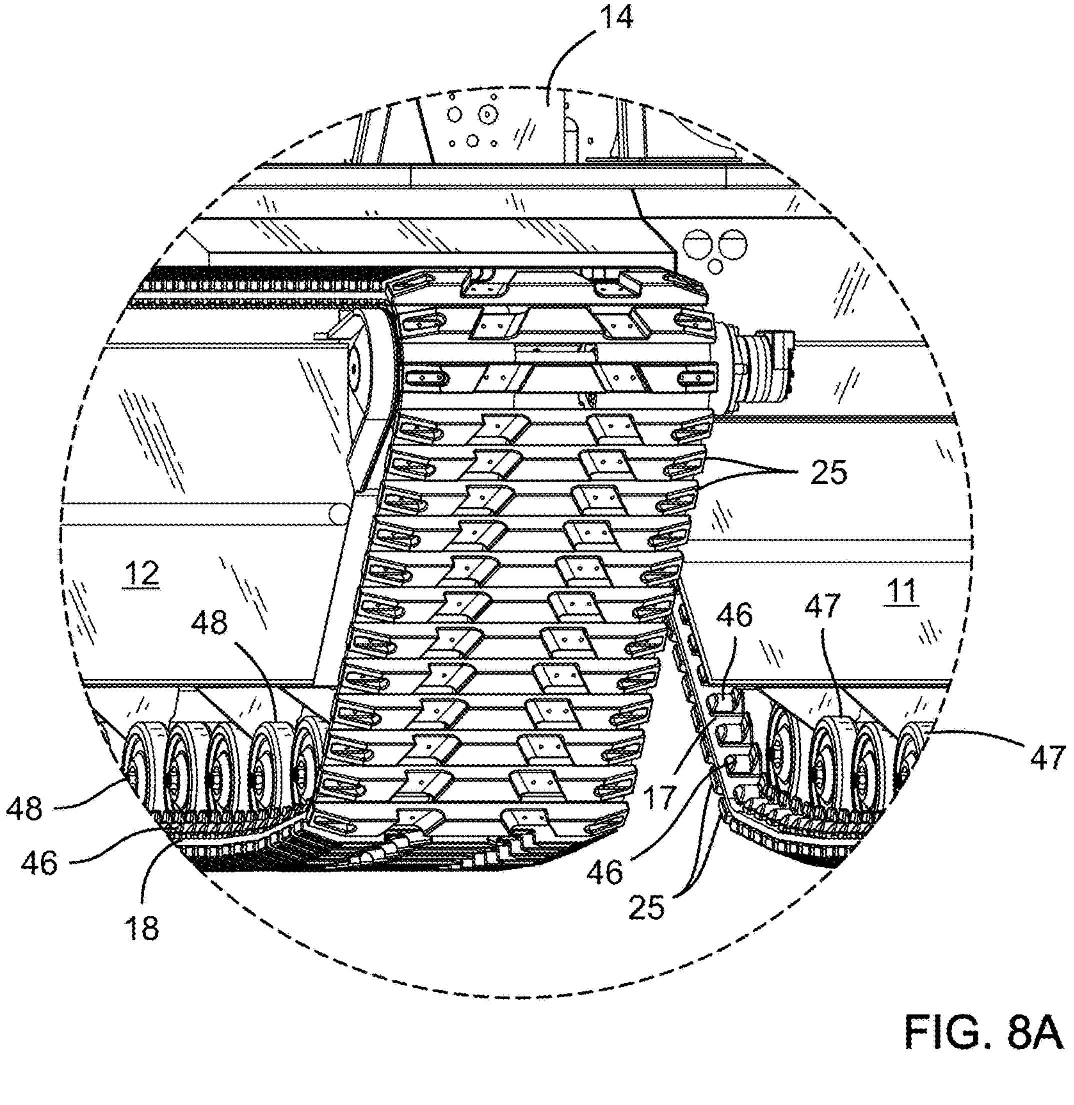
FIG. 8A is a partial perspective view of a preferred embodiment of the apparatus of the present invention and an enlargement of the area encircled on FIG. 8.
Figure 9:
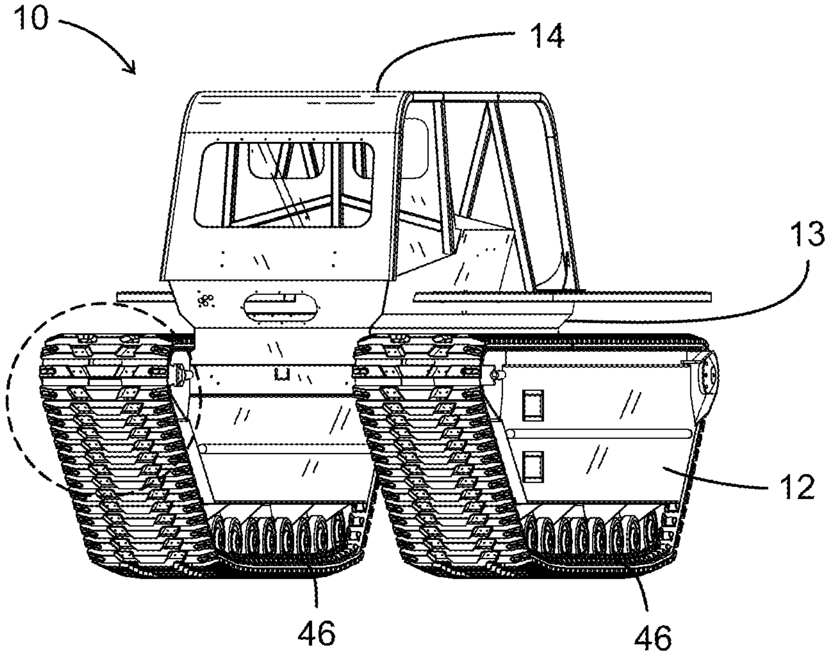
FIG. 9 is a perspective view of a preferred embodiment of the apparatus of the present invention.
Figure 9A:
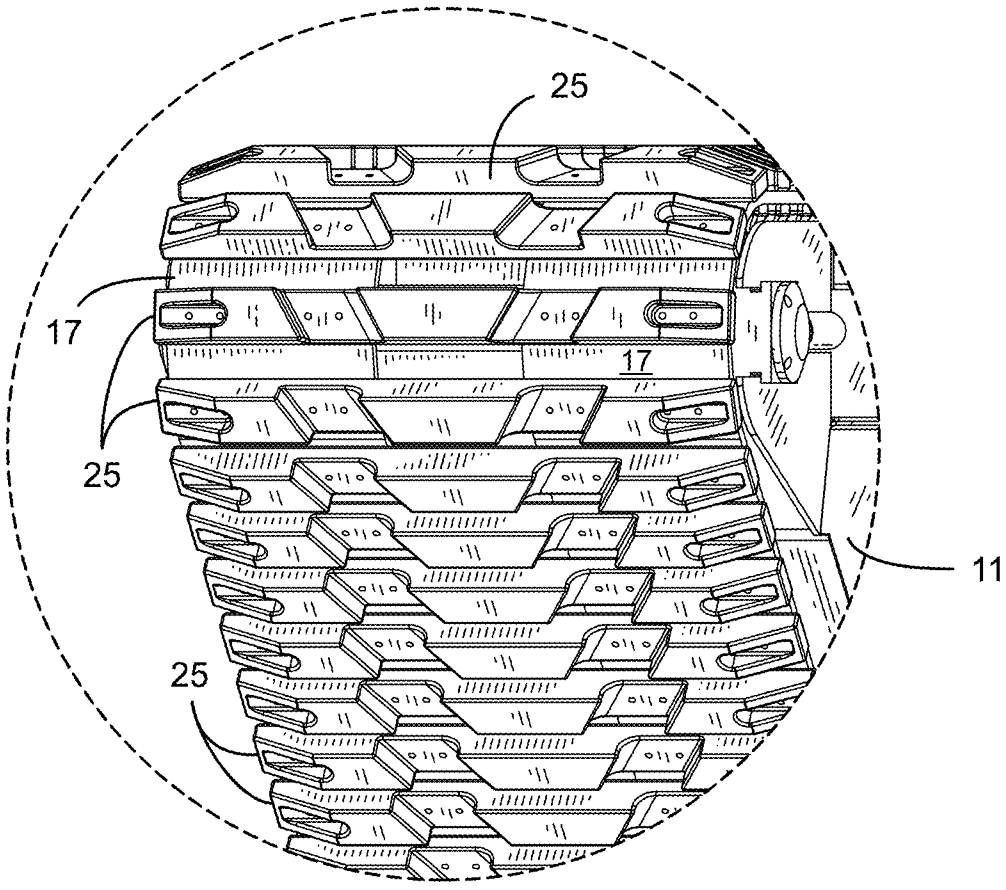
FIG. 9A is a partial perspective view of a preferred embodiment of the apparatus of the present invention and an enlargement of the area encircled on FIG. 9.

FIGS. 1-22 show a preferred embodiment of the apparatus of the present invention, designated generally by the numeral 10. Amphibious craft 10 has spaced apart pontoons 11, 12 that are connected with platform 13. Platform 13 can provide an operator's cabin or seat 14. Platform 13 can support an engine and drive components that move belts or tracks 17, 18 that are attached to pontoon 11, 12 outer surfaces 15 and 16 respectively. Each pontoon 11, 12 has an outer surface 15, 16 to which a belt or track 17, 18 is fitted. Pontoon 11 can be a starboard side pontoon having outer surface 15 to which belt or track 17 is rigged. Pontoon 12 can be a port side pontoon having outer surface 16 to which belt or track 18 is rigged. Pontoon 11 has upper surface portion 19 and lower surface portion 21. Pontoon 12 has upper surface portion 20 and lower surface portion 22. As the craft drive system (e.g., motor, hydraulic pump, hydraulic motors) move each belt or track 17, 18 relative to its pontoon 11, 12, the craft 10 can be propelled forward, rearward or turning (as when the belt on one pontoon moves in a different direction compared to the other pontoon). The above listed John Coast patents show amphibious craft having spaced apart port and starboard pontoons, a platform connecting to the pontoons, an operator's cabin, pontoon outer surfaces, belts/endless belts and drive/guide lugs. Each pontoon 11, 12 has recesses 23, 24 allowing for placement of bogie wheels 47, 48. Such recesses 23, 24 and bogie wheels 47, 48 can be seen for example in FIGS. 1-4 of U.S. Pat. No. 4,433,634, which is hereby incorporated herein by reference.

Cleats 25 are attached to belts 17, 18 and drive/guide lugs 46 with fasteners 41 (e.g., bolts). A hydraulic drive with a sprocket can engage the drive/guide lugs 46. When a cleat 25 mounted to a belt 17 or 18 encounters a stump, rock or other projection, the cleat 25 is subjected to bending or other stress as the weight of the craft 10 is transferred from the pontoon 11 or 12 to the belt 17 or 18 and then to the cleat 25. The present invention provides a cleat 25 of improved configuration. The present invention provides an improved amphibious craft 10 having improved and specially configured cleats 25 which can be polymeric cleats. Cleat 25 is specially configured to minimize accumulation of mud, thus improving machine performance (e.g., on steep, slick river or lake banks). The cleat 25 has three (3) spaced apart pads 32-34 with channels or spaces 35, 36 between the pads 32-34.

In FIGS. 14-22 cleat 25 is provided with a solid center section or pad 32 that increases cleat resistance to bending under a point load such as a stump. The improved cleat 25 enables better forward propulsion or "swimming" of the apparatus 10 when the craft is unsupported and floating (e.g., crossing a lake, stream or other body of water).

Cleat 25 has cleat spaced apart ends 26, 27. The three (3) pads include center pad 32 and end pad 33, 34. A channel, passage, space, or gap is provided between center pad 32 and each end pad 33, 34. Channel, gap or passage 35 is located in between center pad 32 and end pad 33. Channel, gap or passage 36 is located in between center pad 32 and end pad 34. Surfaces 54, 55, 56 border gap 35. Similarly surfaces 57, 58, 59 border gap 36. Surfaces 54 and 57 can have a parallelogram shape as seen in FIGS. 2, 3, 4, 7, 9, 12, 14 and 15. Surfaces 55, 56, 58, 59 each form an acute angle with cleat 25 central longitudinal axis 31. A curved surface 60 is located between surfaces 54, 55. A curved surface 61 is located between surfaces 57, 58.

Each pad 32, 33, 34 provides a ground engaging surface. Pad 32 has surface 28. Pad 33 has surface 29. Pad 34 has surface 30. Each pad 33, 34 provides a tapered portion in between an end 26 or 27 and surface 29 or 30. Pad 33 has tapered portion 37. Pad 34 has tapered portion 38. Each tapered portion 37, 38 has a socket that is protective of a fastener end, such as the head 42 of a bolt 41 (see FIGS. 13A, 13B). Tapered portion 37 has socket 39. Tapered portion 38 has socket 40. The tapered portions 37, 38 reduce the likelihood of point loading thus protecting the track drive/guide lugs 46 while increasing the strength on the ends 26, 27 of each cleat 25. Each tapered portion 37, 38 has diagonally extending portions 52 or 53 on opposing sides of sockets 39 or 40.

Figure 10:
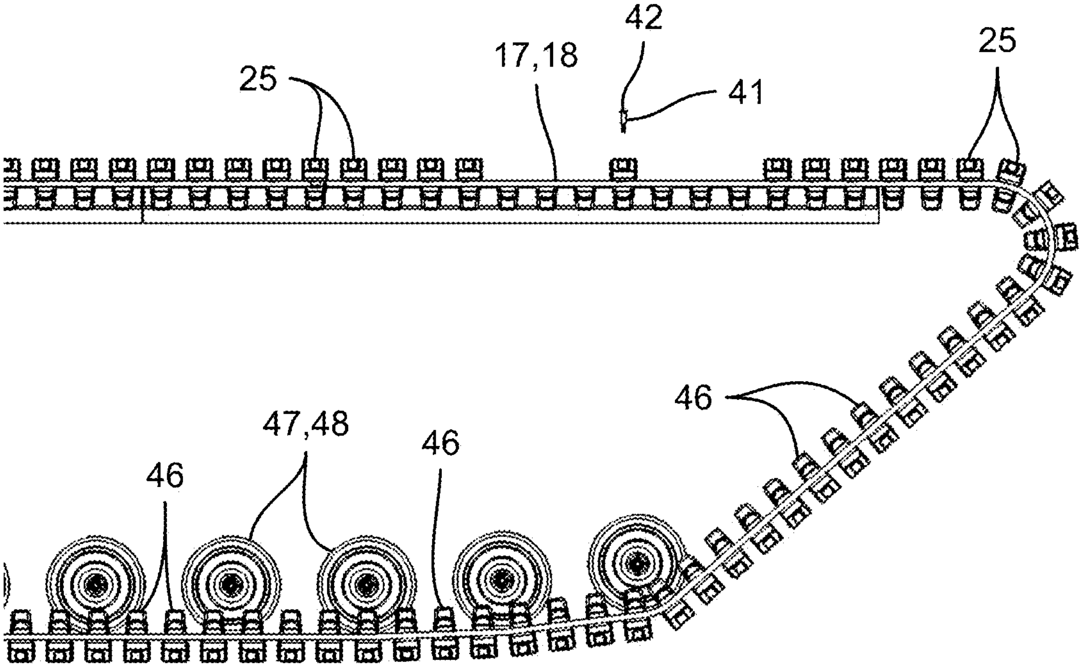
FIG. 10 is a partial side view of a preferred embodiment of the apparatus of the present invention.
Figure 11:
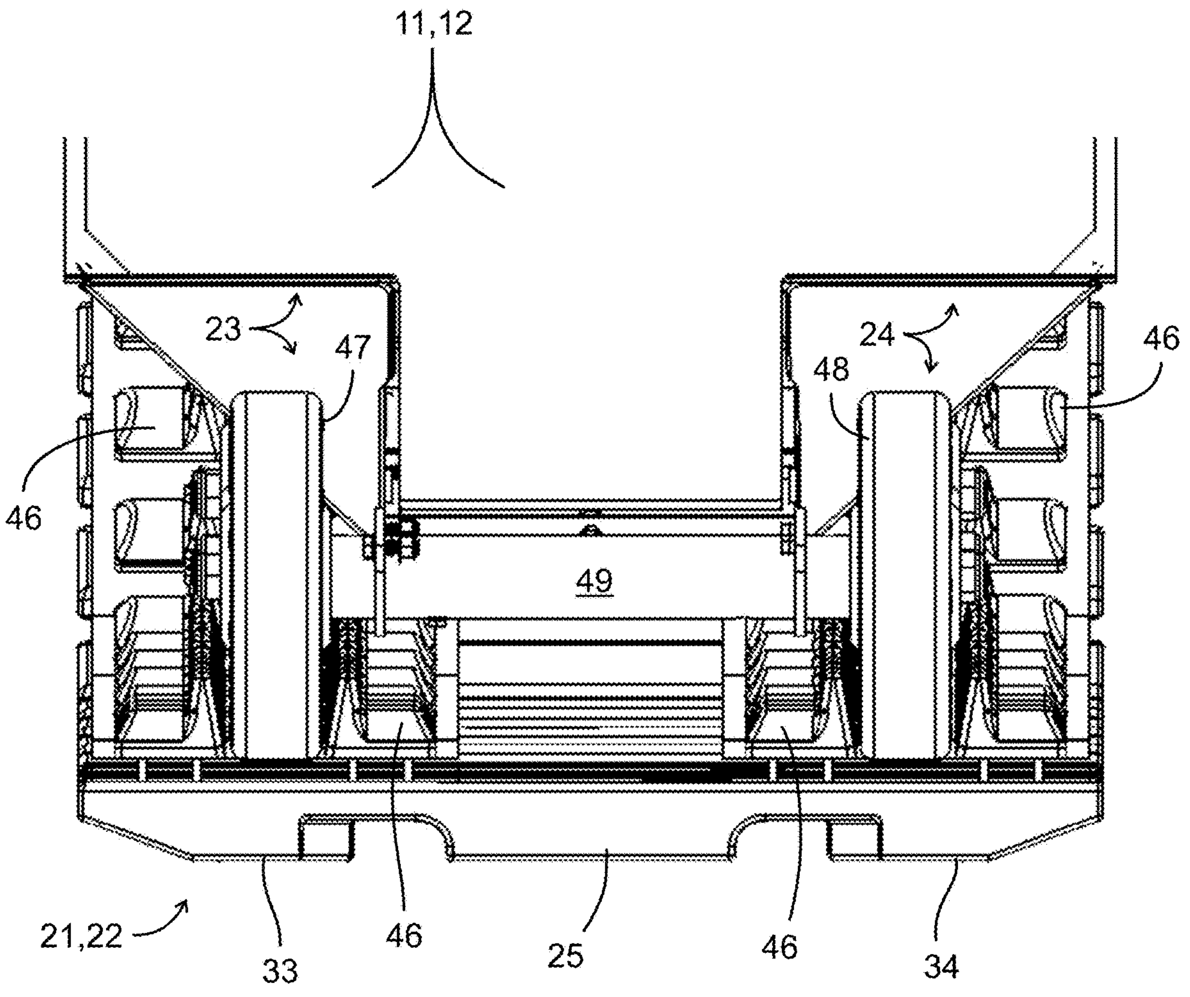
FIG. 11 is a partial frontal elevation view of a preferred embodiment of the apparatus of the present invention.
Figure 13A:
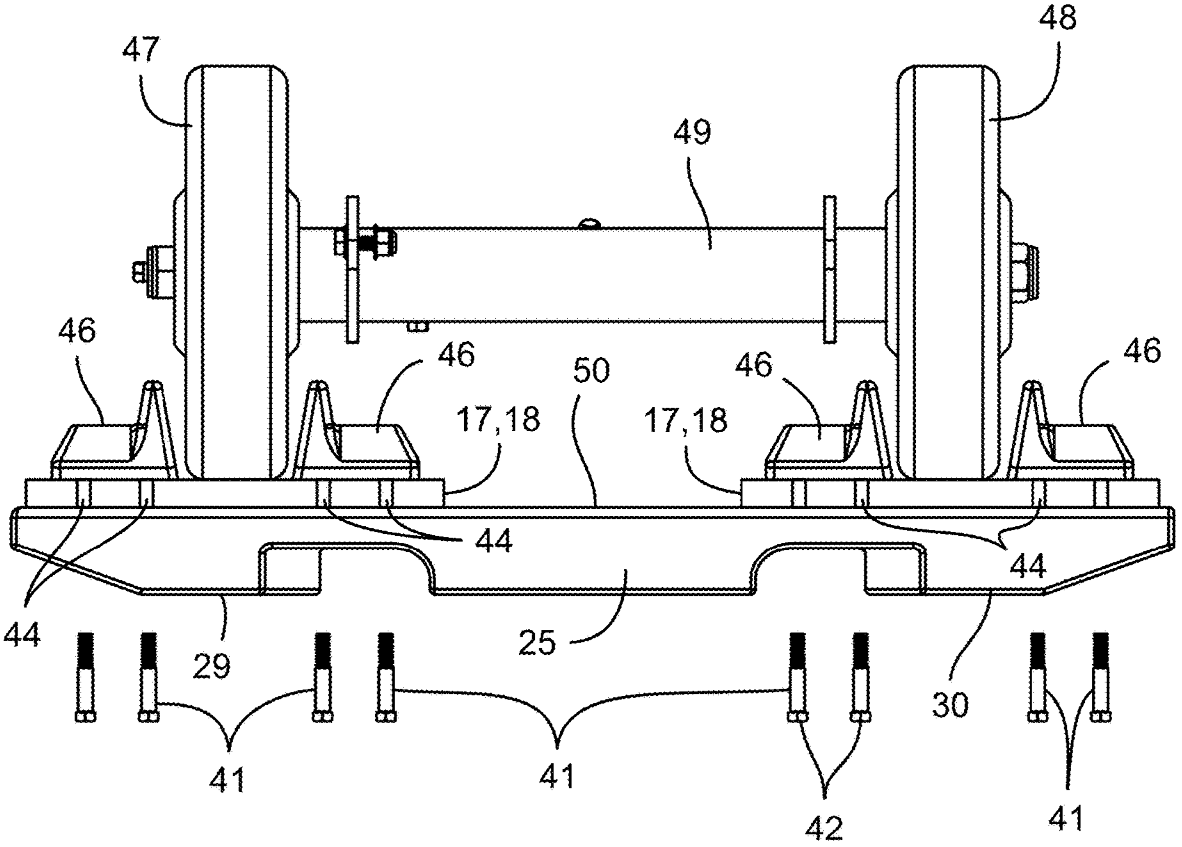
FIG. 13A-13B are partial frontal elevation views of a preferred embodiment of the apparatus of the present invention.
Figure 13B:
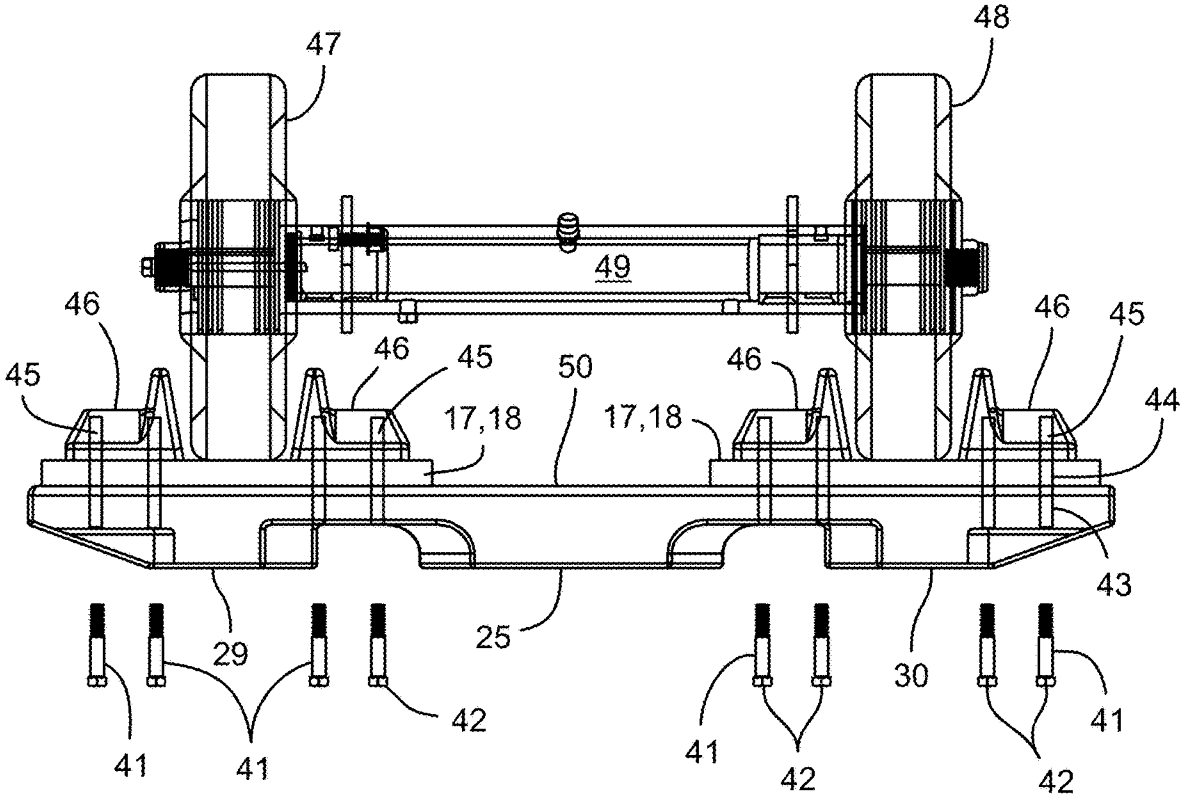
Figure 14:
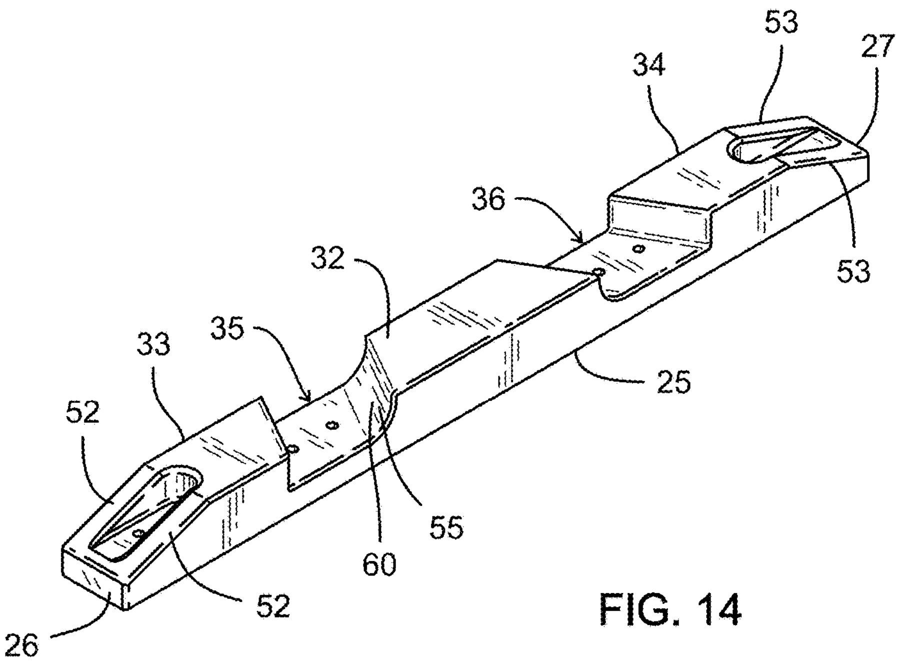
FIG. 14 is a partial perspective view of a preferred embodiment of the apparatus of the present invention showing the cleat.
Figure 15:
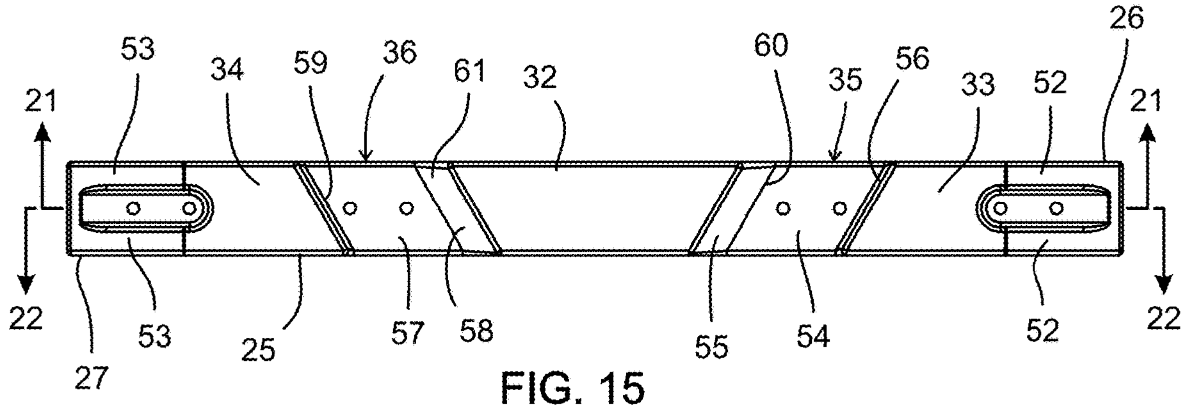
FIG. 15 is a partial top view of a preferred embodiment of the apparatus of the present invention showing the cleat.
Figure 16:
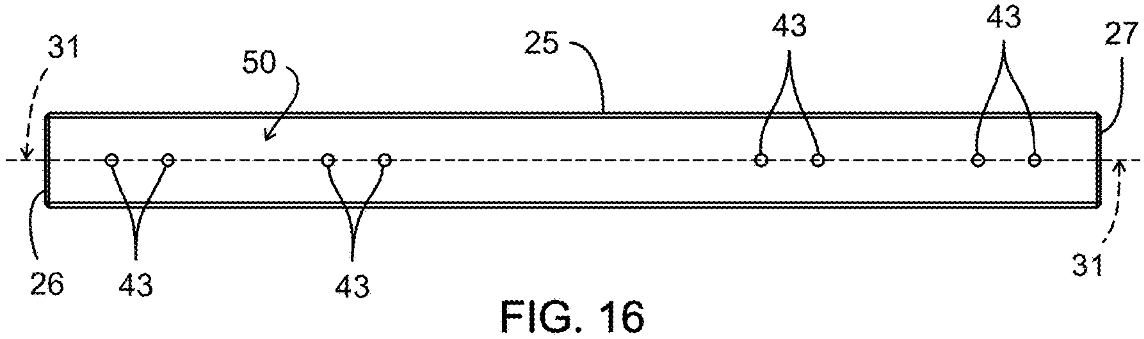
FIG. 16 is a partial bottom view of the cleat of FIGS. 14-15.
Figure 17:
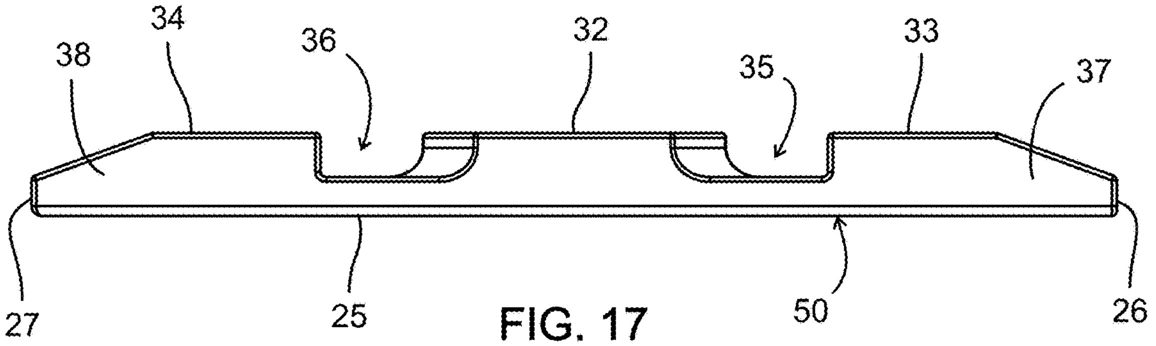
FIG. 17 is a side, elevation view of the cleat of FIGS. 14, 15, 16.
Figure 18:
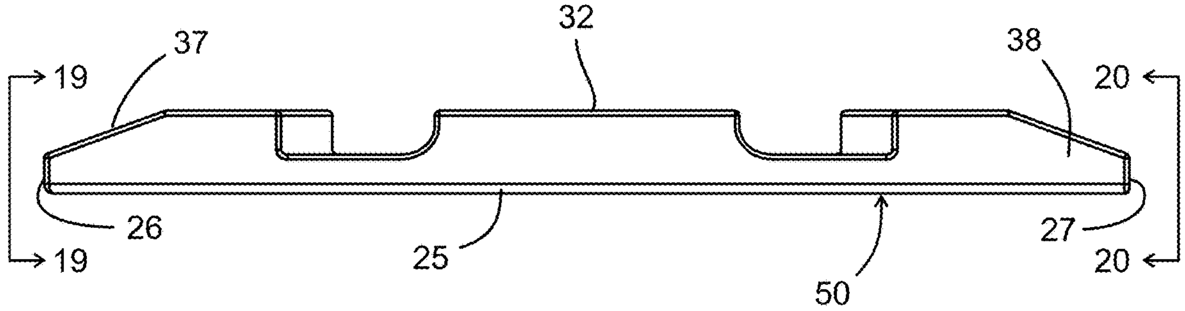
FIG. 18 is a side, elevation view of the cleat of FIGS. 14, 15, 16.
Figure 19:
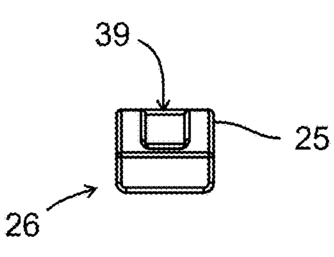
FIG. 19 is an end view of the cleat of FIGS. 14, 15, 16, 17, 18 taken along lines 19-19 of FIG. 18.
Figure 20:
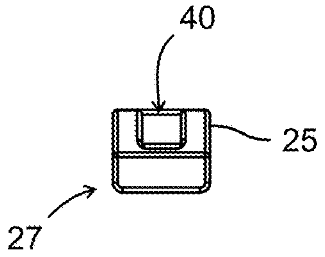
FIG. 20 is an end view of the cleat of FIGS. 14, 15, 16, 17, 18 taken along lines 20-20 of FIG. 18.
Figure 21:
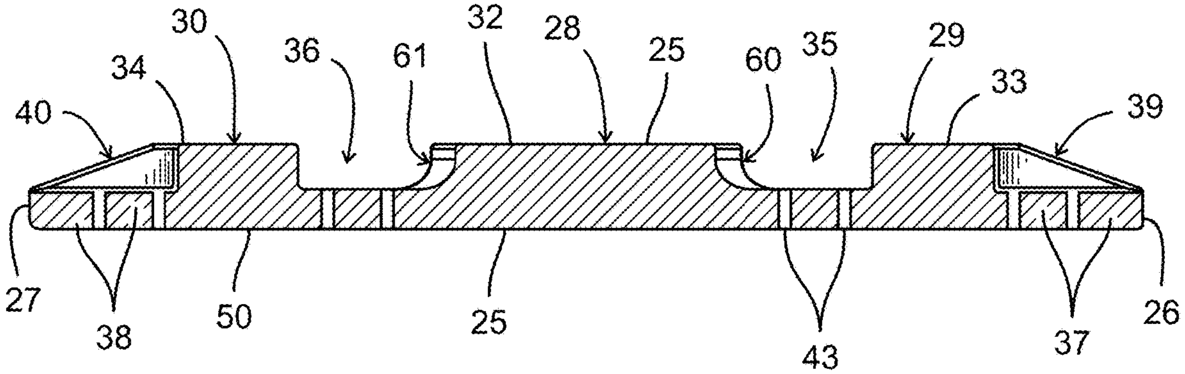
FIG. 21 is a sectional view taken along lines 21-21 of FIG. 15.
Figure 22:
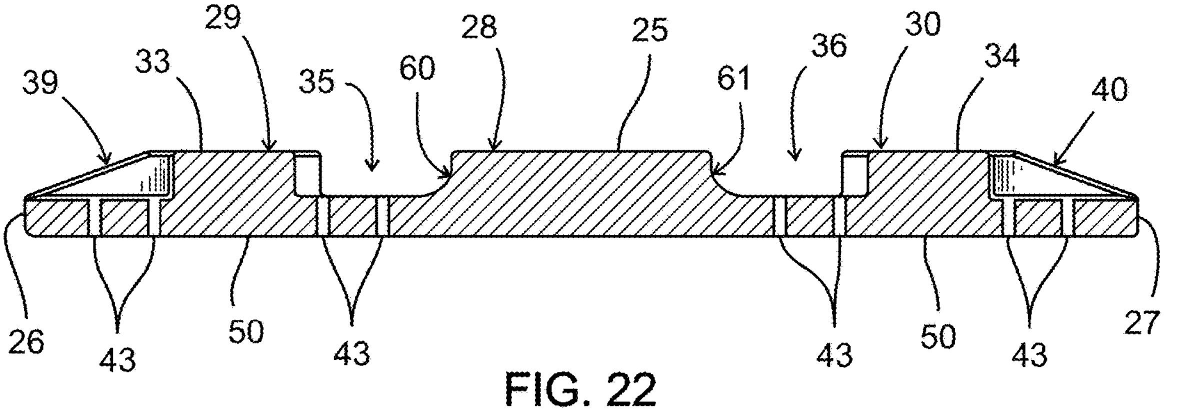
FIG. 22 is a sectional view taken along lines 22-22 of FIG. 15.

Each bolt 41 passes through openings 43 in cleat 25 as well as through openings 44 in belts 17, 18 to threadably connect with an internally threaded opening 45 of drive lug 46. In FIGS. 11, 13A and 13B, each bogie wheel 47, 48 is generally vertically aligned with a pad 33, 34 at surface 29 or 30. Bogie wheel 47 is generally vertically aligned with pad 33 surface 29. Bogie wheel 48 is generally vertically aligned with pad 34 surface 30. Bogie wheels 47, 48 are attached to axle 49. Drive lugs 46 are provided on opposing sides of each bogie wheel 47, 48 as seen in FIGS. 11, 13A and 13B. Surface 50 of cleat 25 engages a belt 17 or 18 as seen in FIGS. 10, 13A and 13B.

Figure 12:
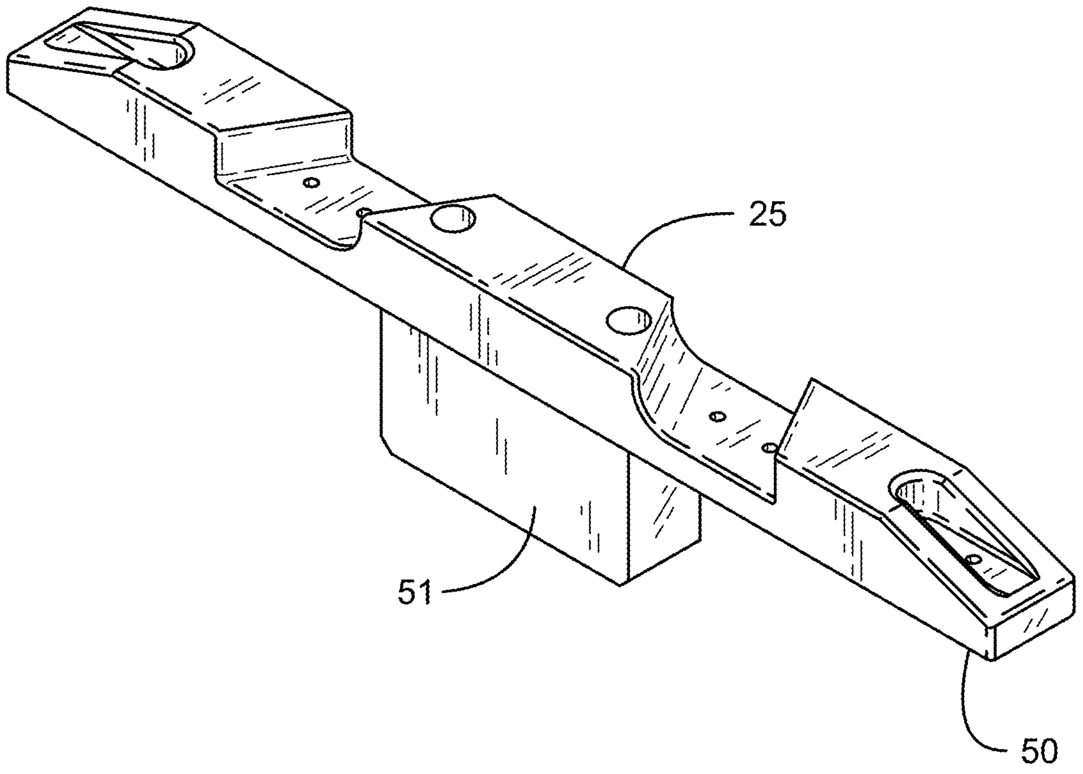
FIG. 12 is a partial perspective view of a preferred embodiment of the apparatus of the present invention showing the cleat fitted with a wiper.

In FIG. 12, surface 50 of cleat 25 can provide wiper 51. Wiper 51 can be a part of cleat 25 or can be removably connected to cleat 25 (e.g., bolted). During travel, wiper 51 removes mud from the upper surface portions 19, 20 of pontoons 11, 12.

PARTS LIST

Part No. Description

10 amphibious craft
11 pontoon (starboard side)
12 pontoon (port side)
13 platform
14 cabin/seat
15 pontoon outer surface
16 pontoon outer surface
17 belt/track/endless belt/drive belt
18 belt/track/endless belt/drive belt
19 pontoon upper surface portion
20 pontoon upper surface portion
21 pontoon lower surface portion
22 pontoon lower surface portion
23 recess
24 recess
25 cleat
26 end
27 end
28 surface/wear surface
29 surface/wear surface
30 surface/wear surface
31 central longitudinal axis
32 center pad/solid center section
33 pad
34 pad
35 channel/passage/gap/space
36 channel/passage/gap/space
37 tapered portion
38 tapered portion
39 socket
40 socket
41 bolt/fastener
42 bolt head
43 opening
44 opening
45 internally threaded opening
46 drive lug/drive and guide lug
47 bogie wheel
48 bogie wheel
49 axle
50 surface
51 wiper
52 diagonally extending portion
53 diagonally extending portion
54 surface
55 surface
56 surface

57 surface
58 surface
59 surface
60 curved surface
61 curved surface All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An amphibious craft, comprising:
a) a hull having spaced apart pontoons;
b) a platform that connects to each said pontoon;
c) a plurality of bogie wheels connected to each pontoon;
d) one or more belts that encircle each pontoon;
e) drive lugs attached to each of the belts, drive lugs positioned on opposing sides of each bogie wheel;
f) a plurality of polymeric cleats that are attached to the belts and drive lugs with fasteners, each cleat having a central longitudinal axis;
g) each cleat having a center pad, a pair of spaced apart end pads and diagonally extending channels or spaces or gaps in between each end pad and the center pad;
h) each cleat having a tapered section with a socket; and
i) each fastener having a head located within said socket.

2. The amphibious craft of claim 1 wherein there is a radius curved section next to the center pad.

3. The amphibious craft of claim 1 wherein the cleat has fastener receptive openings in between the center pad and the end pads.

4. The amphibious craft of claim 1 wherein there are fastener receptive openings communicating with each socket.

5. The amphibious craft of claim 1 further comprising a wiper on said cleat extending away from said center pad.

6. The amphibious craft of claim 5 wherein said wiper is rigid and of polymeric material.

7. The amphibious craft of claim 1 wherein the fasteners are bolts each having a bolt head located in a said socket.

8. The amphibious craft of claim 1 wherein each tapered section includes diagonally extending surfaces on opposing sides of said socket.

9. The amphibious craft of claim 1 wherein each channel or space or gap is between a first surface on the center pad and a second surface on the end pad, said first and second surfaces each forming an acute angle with said central longitudinal axis.

10. The amphibious craft of claim 1 wherein said center pad having a wear surface that is generally trapezoidally shaped.

11. An amphibious craft, comprising:
a) a hull having spaced apart pontoons;
b) a platform that connects to each said pontoon;
c) a plurality of bogie wheels connected to each pontoon;
d) one or more belts that encircle each pontoon;
e) drive lugs attached to each of the belts, drive lugs positioned to travel on opposing sides of each bogie wheel;
f) a plurality of polymeric cleats that are attached to the belts and drive lugs with fasteners, each cleat having a central longitudinal axis;
g) each cleat having a center pad, a pair of spaced apart end pads and diagonally extending channels or spaces or gaps in between each end pad and the center pad;
h) each cleat having a tapered section with a socket; and
i) each fastener extending into said socket.

12. An amphibious craft, comprising:
a) a hull having spaced apart pontoons;
b) a platform that connects to each said pontoon;
c) a plurality of bogie wheels connected to each pontoon;
d) one or more belts that encircle each pontoon;
e) drive lugs attached to each of the belts, drive lugs positioned to travel on opposing sides of each bogie wheel;
f) a plurality of polymeric cleats that are attached to the belts and drive lugs with fasteners, each cleat having a central longitudinal axis; and
g) each cleat having a center pad, a pair of spaced apart end pads and diagonally extending gaps in between each end pad and the center pad.

13. The amphibious craft of claim 12 wherein there is a radius curved section next to the center pad.

14. The amphibious craft of claim 12 wherein the cleat has fastener receptive openings in between the center pad and the end pads.

15. The amphibious craft of claim 12 further comprising a wiper on said cleat extending away from said center pad.

16. The amphibious craft of claim 15 wherein said wiper is rigid and of polymeric material.

17. The amphibious craft of claim 11 wherein each tapered section includes diagonally extending surfaces on opposing sides of said socket.

18. The amphibious craft of claim 12 wherein each channel or space or gap is between a first surface on the center pad and a second surface on the end pad, said first and second surfaces each forming an acute angle with said central longitudinal axis.

19. The amphibious craft of claim 12 wherein said center pad having a wear surface that is generally trapezoidally shaped.

20. The amphibious craft of claim 12 wherein each diagonally extending gap has a parallelogram shape.

* * * * *